May 13, 1930.  J. E. REID  1,758,411
SPRING SUSPENSION
Filed Aug. 19, 1926   4 Sheets-Sheet 1

May 13, 1930.  J. E. REID  1,758,411
SPRING SUSPENSION
Filed Aug. 19, 1926  4 Sheets-Sheet 3

Inventor
Josiah E. Reid
By his Attorneys
Redding, Greeley, O'Shea & Campbell

May 13, 1930.  J. E. REID  1,758,411
SPRING SUSPENSION
Filed Aug. 19, 1926  4 Sheets-Sheet 4
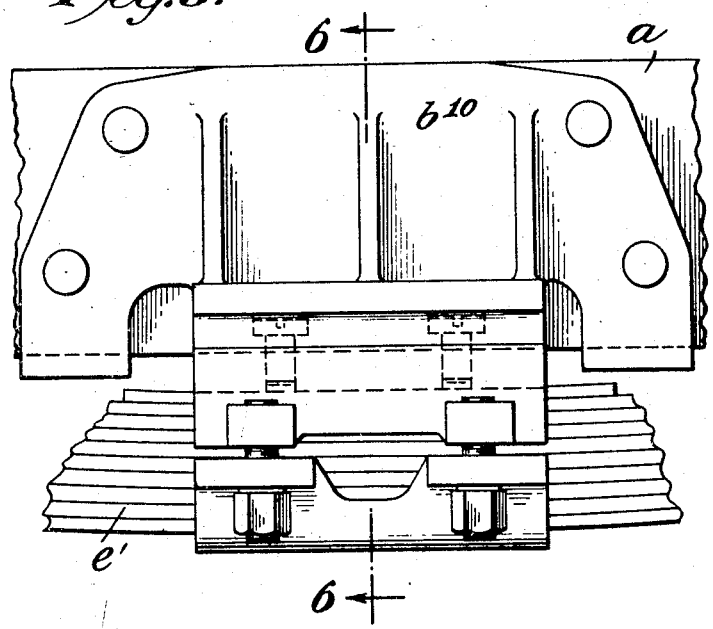
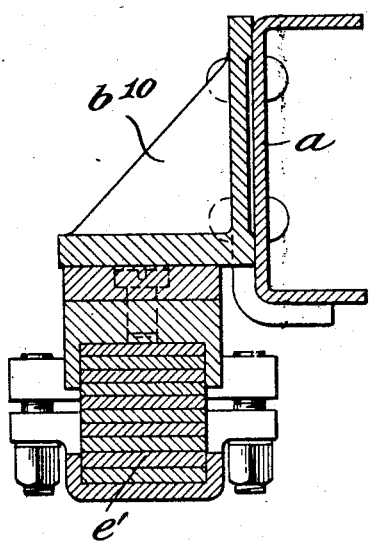
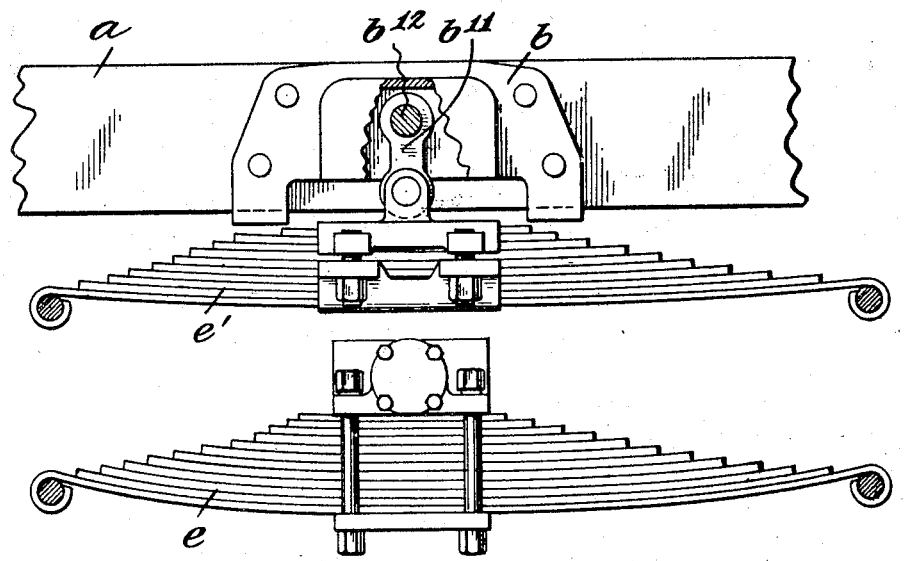

Patented May 13, 1930

1,758,411

UNITED STATES PATENT OFFICE

JOSIAH E. REID, OF NEW YORK, N. Y., ASSIGNOR TO INTERNATIONAL MOTOR COMPANY, OF NEW YORK, N. Y., A CORPORATION OF DELAWARE

SPRING SUSPENSION

Application filed August 19, 1926. Serial No. 130,130.

The present invention relates to spring suspension for vehicles wherein heavy loads are to be carried and wherein the most efficient spring operation is obtained throughout wide ranges of loads.

With existing structures the spring is most effective during its middle range of loads and at light or heavy loads it is too stiff or not of sufficient resistance for a given deflection. Where two springs are tied together above and below the axle, the resulting effect is simply that of a more powerful spring. It is to remedy this disadvantage and to provide a structure which will give efficient operation over a wide range of loads, that this invention is designed.

More particularly, this invention deals with motor vehicles having dual rear axles, between which the load is supported and which have upper and lower springs secured thereto. A further object, therefore, is to provide a construction which will yieldingly resist pivotal movement of the axles about their center of support.

Reference will now be had to the accompanying drawings for a more detailed description of the invention, wherein:

Figure 5 is a view of the upper spring connection in a modified form.

Figure 6 is a section on line 6—6 of Figure 5.

Figure 7 is a side elevation, partly broken away, showing a further modification.

Figure 1:
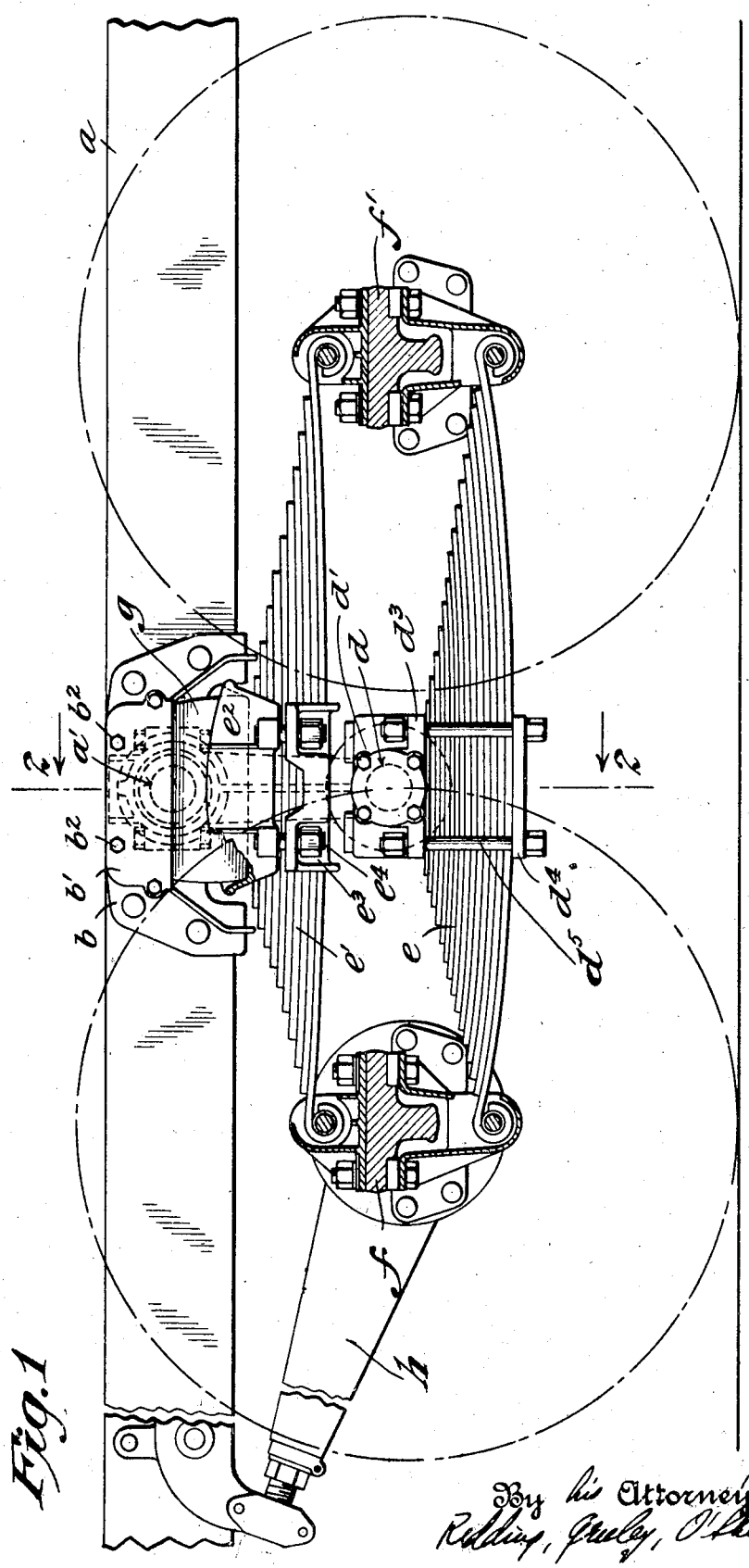
Figure 1 shows a side elevation, partly broken away, of the spring suspension.
Figure 2:
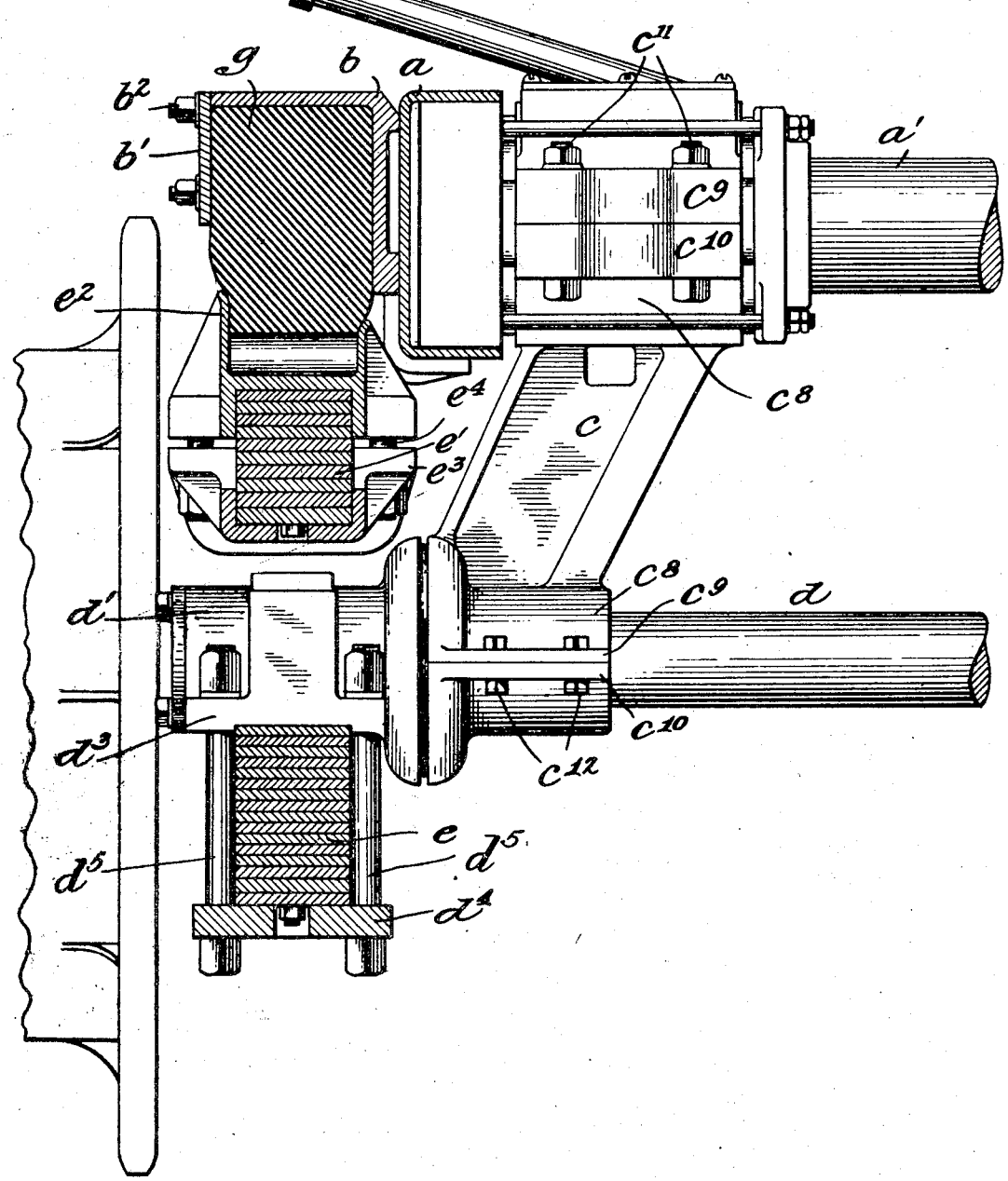
Figure 2 is a view, partly in section, taken on the line 2—2 of Figure 1 and looking in the direction of the arrows.

In the drawings $a$ represents the channel members of the frame of a motor vehicle having a pivoting axle $a'$ secured therebetween. On the outside of the channels and coaxial with the axle', brackets $b$ are secured. Front plates $b'$ may be bolted thereto, as by bolts $b^2$ and in this manner blocks of yielding non-metallic material, such as rubber, may be retained by the brackets.

A bracket $c$ pivoted to the axle $a'$, serves to mount the frame on pivoting axle $d$, the latter being provided with closed end housings $d'$. Bracket $c$ has its ends formed with bearings $c^8$ in which the respective shafts are mounted and co-operating bearing sections $c^9$ and $c^{10}$ are provided to secure the shafts thereto. These are bolted to the portions $c^8$ by means of bolts $c^{11}$ and $c^{12}$.

Upon housings $d'$ are formed brackets $d^3$ between which brackets and plate $d^4$, is secured a lower spring $e$ by means of bolts $d^5$. This spring is connected to the dual axles $f$ and $f'$ at their under sides and spring $e'$ is connected therebetween at the upper sides of the axles. A buffing seat $e^2$ is clamped to the thickest part of the spring by means of a co-operating clamping member $e^3$ and bolts $e^4$. There is no positive connection between the spring $e'$ and the frame of the vehicle but in order that it comes into play at the proper time a rubber or other cushioning block $g$ is mounted on the frame $a$ directly above the buffing seats $e^2$. As previously described, the brackets $b$ form a housing for the rubber block $g$.

Figure 3:
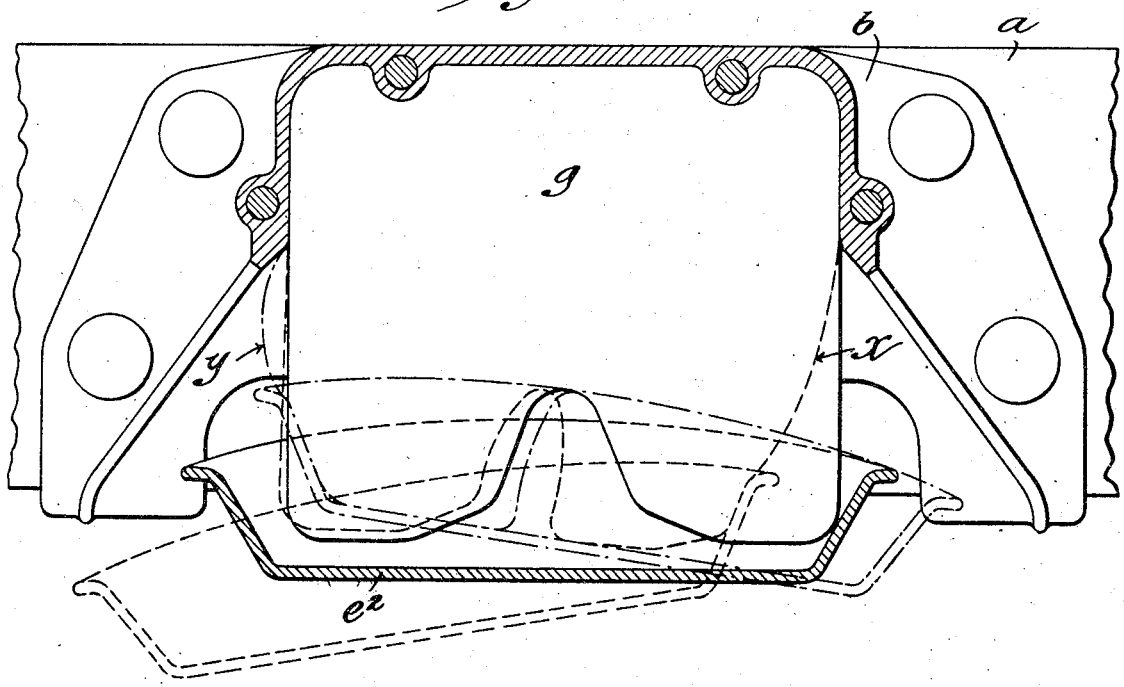
Figure 3 is a view in section showing the operation of the upper connection when the vehicle is unloaded.
Figure 4:
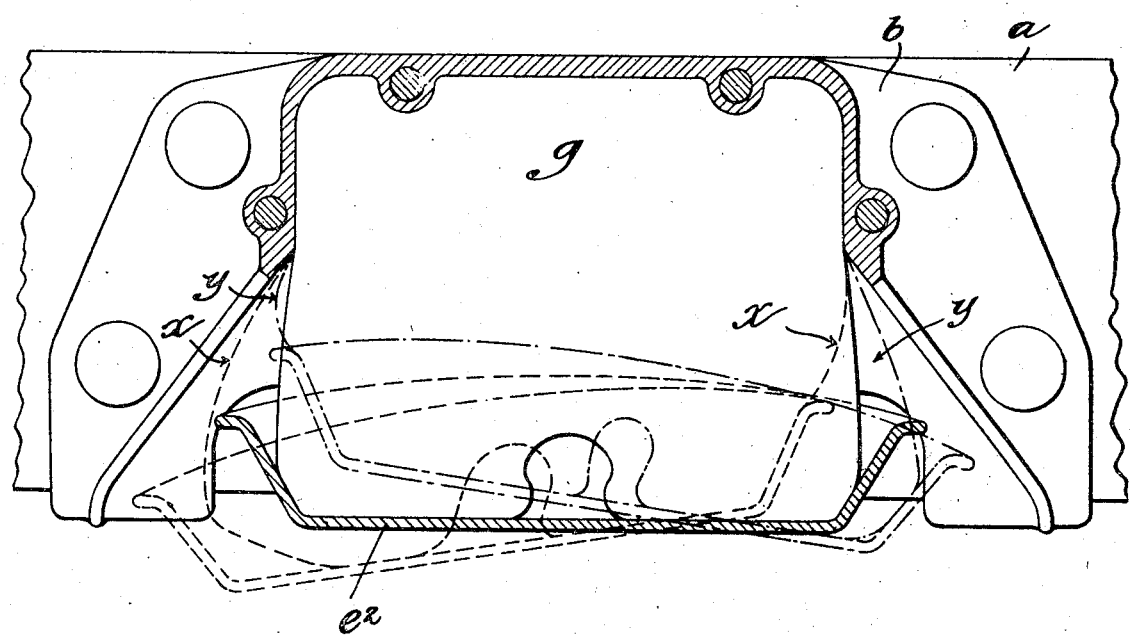
Figure 4 is a view similar to Figure 3 but illustrating the operation of the suspension when the vehicle is fully loaded.

In Figures 3 and 4 the operation of the rubber cushion is shown when the vehicle is unloaded and loaded, respectively. In Figure 3 it will be seen that the seat $e^2$ does not engage the block $g$ under normal conditions and at no load. However, when the truck moves over an obstacle or an irregularity in the road, wherein one axle is higher than the other, the block engages the seat. Under such conditions it will be seen that the rubber flexes considerably into either extreme position as indicated in dotted lines at $x$ and $y$.

In Figure 4 the operation is indicated when the vehicle is fully loaded. In this case, there is less flexing, for the rubber engages the seat at all times and in the extreme conditions described above, the flow of the rubber takes place between the seat and the retaining housing in the bracket $b$, whereas, at no load the rubber works within the seat more than between the two.

In order to give better traction, the axle $d$ is mounted on the spring nearer the driving wheels than the trailing wheels and the character of the suspension, during light position, permits the lower spring to be loaded through its good working ranges, while, when heavily loaded, the top spring meets the rubber and comes into play, permitting both springs to operate through their proper middle ranges.

In Figures 5 and 6 a modified form is shown wherein the upper spring rests slidably upon a bracket $b^{10}$ secured to the frame. In this form, the two springs co-operate to carry the load of the vehicle, and the upper spring movement is permitted through the slidable connection with the bracket on the frame.

In the form shown in Figure 7 the lower spring is connected in the above described manner but the upper spring has secured thereto a link $b^{11}$ which in turn is pivoted to the frame at $b^{12}$. This construction permits relative movement of the spring and frame and enables the load to be shared by each spring as in the above modified construction.

In all of the forms described above a radius rod $h$ spaces the forward axle $f$ from the frame $a$ and prevents the assembly from collapsing. This element is an essential part of the structure since it prevents the forward axle from flopping over.

Changes in the above design may be made to adapt it to a particular need or modified elements may be employed without departing from the scope of this invention, the latter being pointed out particularly in the appended claims.

What I claim is:

1. In a spring suspension, a vehicle frame, a pivoting axle secured thereto, a second axle, means to pivotally connect the axes, a pair of axles, a spring connecting the pair of axles and mounted on the second axle, and a second spring connected to the pair of axles at the sides thereof opposite to the first spring.

2. In a spring suspension, a vehicle frame, a pivoting axle secured thereto, a second axle, means to pivotally connect the axles, a pair of axles, a spring connecting the pair of axles and mounted on the second axle at a point on the spring of unequal distance from the respective axles of the pair, and a second spring connected to the pair of axles at the sides thereof opposite to the first spring.

3. In a spring suspension, a vehicle frame, a pivoting axle secured thereto, a second axle, means to pivotally connect the axles, a pair of axles, a spring connecting the pair of axles and mounted on the second axle, a second spring connected to the pair of axles at the sides thereof opposite to the first spring, and means to connect the second spring with the frame.

4. In a spring suspension, a vehicle frame, a pivoting axle secured thereto, a second axle, means to pivotally connect the axles, a pair of axles, a spring connecting the pair of axles and mounted on the second axle, a second spring connected to the pair of axles at the sides thereof opposite to the first spring, and independent means to connect the second spring with the frame.

5. In a spring suspension, a vehicle frame, a pivoting axle secured thereto, a second axle, means to pivotally connect the axles, a pair of axles, a spring connecting the pair of axles and mounted on the second axle, a second spring connected to the pair of axles at the sides thereof opposite to the first spring, a buffing seat on the second spring, a buffer on the frame, and means to cause the seat to engage the buffer when one axle is moved out of the horizontal plane of the axles due to irregularities in the road surface.

6. In a spring suspension for dual rear axles, a vehicle frame, two independent springs at each side of the frame lying in the same vertical plane and having their ends secured to the axles, respectively, means to engage the frame with one of the springs intermediate its ends, and independent means to engage the frame with the other spring intermediate its ends.

7. In a spring suspension for dual rear axles, a vehicle frame, a spring at each side of the frame secured to the respective axles, means to secure said spring to the frame, a second spring lying in the same vertical plane as the first spring and secured to the respective axles, and means whereby said second spring is engageable by the frame independently of the first named spring.

8. In a spring suspension for dual rear axles, a vehicle frame, a spring at each side of the frame lying in the same vertical plane as the first spring and secured to the respective axles, means pivoted to the frame to secure said spring thereto, a second spring secured to the respective axles, and means whereby said second spring is engageable by the frame independently of the first named spring.

9. In a spring suspension for dual rear axles, a vehicle frame, a spring at each side of the frame secured thereto and to the respective axles, and a second spring lying in the same vertical plane as the first spring and secured to the respective axles and normally spaced from the frame, said second spring being engageable by the frame upon predetermined deflection of the first named spring.

10. In a spring suspension for dual rear axles, a vehicle frame, two independent springs at each side of the frame having their ends secured to the axles, respectively, means to engage the frame with one of the springs intermediate its ends, and independent means to engage the frame with the other spring intermediate its ends and in the same transverse vertical plane as the first engaging means.

This specification signed this 17th day of August, A. D. 1926.

JOSIAH E. REID.